US010680818B2

(12) United States Patent
Bos et al.

(10) Patent No.: US 10,680,818 B2
(45) Date of Patent: Jun. 9, 2020

(54) ENCRYPTION SCHEMES WITH ADDITIONAL PROPERTIES

(71) Applicant: NXP B.V., Eindhoven (NL)

(72) Inventors: Joppe Willem Bos, Wijgmaal (BE); Marc Joye, Palo Alto, CA (US)

(73) Assignee: NXP, Eindhoven (NL)

( * ) Notice: Subject to any disclaimer, the term of this patent is extended or adjusted under 35 U.S.C. 154(b) by 274 days.

(21) Appl. No.: 15/951,590

(22) Filed: Apr. 12, 2018

(65) Prior Publication Data

US 2019/0319791 A1  Oct. 17, 2019

(51) Int. Cl.
*H04L 9/30* (2006.01)

(52) U.S. Cl.
CPC .................................. *H04L 9/3033* (2013.01)

(58) Field of Classification Search
None
See application file for complete search history.

(56) References Cited

U.S. PATENT DOCUMENTS

| 9,432,191 B2* | 8/2016 | Alessio | ..................... | H04L 9/30 |
| 2009/0182667 A1* | 7/2009 | Parkes | ............... | G06Q 20/0855 705/50 |
| 2019/0036678 A1* | 1/2019 | Ahmed | ................... | H04L 9/083 |

OTHER PUBLICATIONS

A. Barnett, et al. "Image Classification using non-linear Support Vector Machines on Encrypted Data." IACR Cryptology ePrint Archive 2017 (2017): 857.

K. Ohta, et al. "A Modification of the Fiat-Shamir Scheme", Goldwasser (Ed.): Advances in Cryptology—CRYPT0 '88, LNCS 403, pp. 232-243, (1990).
Y. Rahulamathavan, et al. "Privacy-Preserving Multi-Class Support Vector Machine for Ourtsourcing the Data Classification in Cloud", IEEE Trans . . . , v.11(5), 467-479 (2014).
Camenisch, Jan et al., "Practical Verifiable Encryption and Decryption of Discrete Logarithms;" Advances in Cryptology, 23rd Annual International Cryptology Conference, Santa Barbara, California, Aug. 17-21, 2003.
Neugebauer, Georg et al., "Privacy-Preserving Multi-Party Reconciliation Secure in the Malicious Model (Extended version);" International Association for Cryptologic Research; vol. 20131015:065429, Oct. 11, 2013.
Wikström, Douglas; "Designated Confirmer Signatures Revisited;" International Association for Cryptologic Research, Feb. 26, 2007, pp. 1-56, vol. 20111003:075250.
Fiat, "How to Prove Yourself: Practical Solutions to Identification and Signature Problems", Advances in Cryptology-CRYPTO '86, LNCS 263, pp. 186-194 (1987).
Goldwasser, et al., "The Knowledge Complexity of Interactive Proof Systems", Siam J. Comput., vol. 18, No. 1, pp. 186-208 (Feb. 1989).

(Continued)

*Primary Examiner* — Benjamin E Lanier

(57) ABSTRACT

Various embodiments relate to a method of encrypting a message m using a Paillier cryptosystem, including: computing a ciphertext c based upon the message m, N, and r, where N is the product of two distinct primes p and q, and r is randomly chosen such that $r \in [1, N)$; computing a first verification value based upon u and N, where u is randomly chosen such that $u \in [1, N)$; computing a second verification value s based upon u, r, the ciphertext c, the verification value, and a hash function H.

16 Claims, 1 Drawing Sheet

(56) References Cited

OTHER PUBLICATIONS

Guillou, et al., "A "Paradoxical" Identity-Based Signature Scheme Resulting from Zero-Knowledge", Advances in Cryptology—CRYTPO '88, LNCS 403, pp. 216-331 (1990).
Guillou, et al., "A Practical Zero-Knowledge Protocol Fitted to Security Microprocessor Minimizing Both Transmission and Memory", Advances in Cryptology-EUROCRYPT '88, LNCS 330, pp. 128-128 (1988).
Pallier, "Public-Key Cryptosystems Based on Composite Degree Residuosity Classes", EUROCRYPT '99, LNCS 1592, pp. 223-238, 1999.
Schnorr, "Efficient Signature Generation by Smart Cards", Journal of Cryptology (1991)4: 161-174.

\* cited by examiner

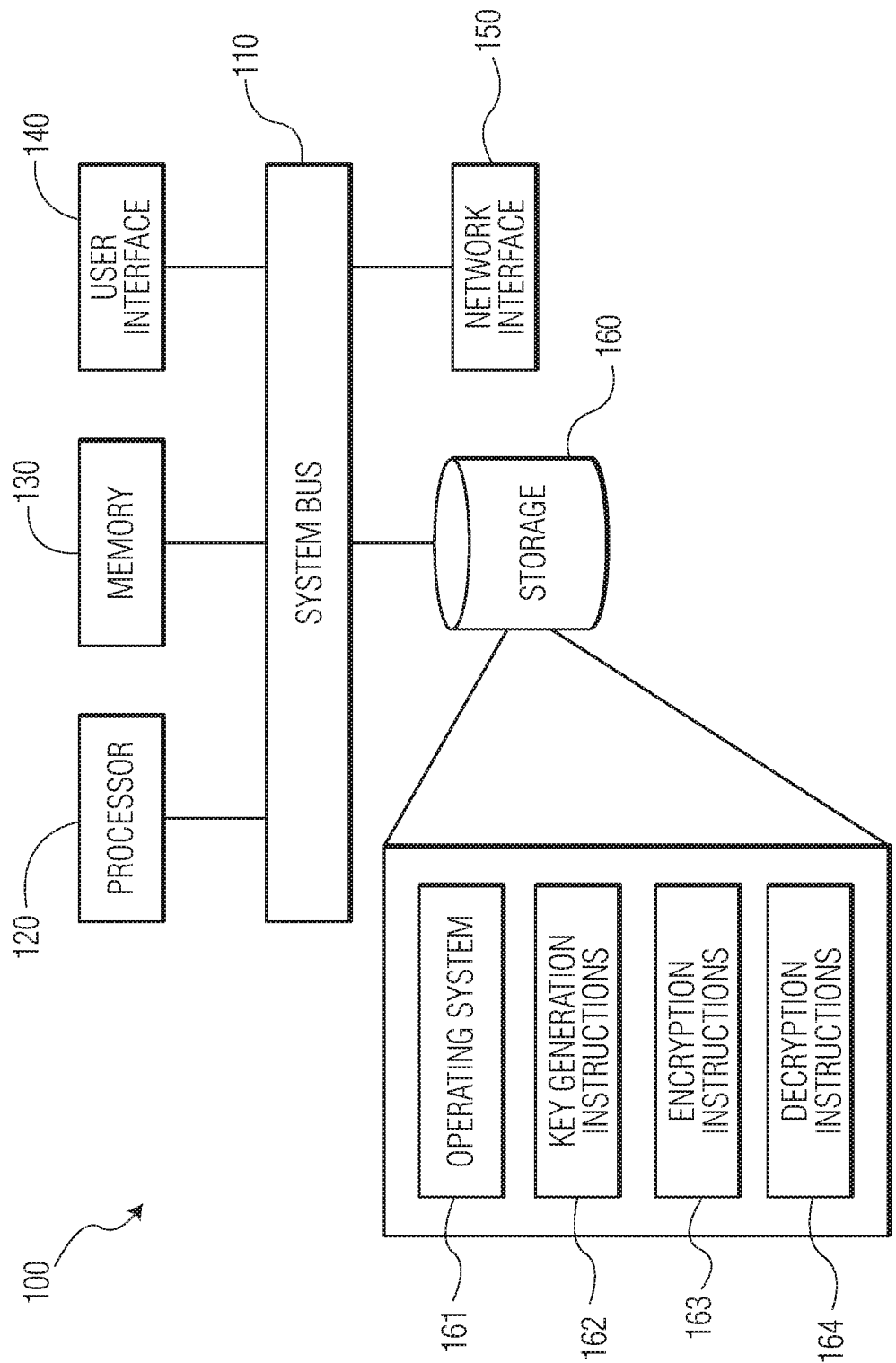

ENCRYPTION SCHEMES WITH ADDITIONAL PROPERTIES

TECHNICAL FIELD

Various exemplary embodiments disclosed herein relate generally to a method and apparatus for implementing new encryption schemes with additional properties.

BACKGROUND

Various schemes have been developed for encrypting and decrypting data. Chosen ciphertext attacks are one method used by attacker to compromise encryption and decryption schemes, so implementing encryption schemes resistant to chosen ciphertext attacks provides increased security.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of encrypting a message m using a Paillier cryptosystem, including: computing a ciphertext c based upon the message m, N, and r, where N is the product of two distinct primes p and q, and r is randomly chosen such that $r \in [1, N)$; computing a first verification value based upon u and N, where u is randomly chosen such that $u \in [1, N)$; computing a second verification value s based upon u, r, the ciphertext c, the verification value, and a hash function H.

Various embodiments are described, wherein $c = (1+mN) r^N \bmod N^2$.

Various embodiments are described, wherein $U = u^N \bmod N$ where U is the first verification value.

Various embodiments are described, wherein $s = ur^e \bmod N$ and where $e = H(c, U)$.

Various embodiments are described, wherein $s = ur^e \bmod N$ and where $e = H(c, U, pk)$ where pk is a public key.

Various embodiments are described, wherein $V = H(u^N \bmod N)$ where V is the first verification value.

Various embodiments are described, wherein $s = ur^e \bmod N$ and where $e = H(c, V)$.

Various embodiments are described, wherein $s = ur^e \bmod N$ and where $e = H(c, U, pk)$ where pk is a public key.

Various embodiments are described, wherein $V = G(u^N \bmod N)$ where V is the first verification value and G is a hash function different from hash function H.

Various embodiments are described, wherein $s = ur^e \bmod N$ and where $e = H(c, V)$.

Various embodiments are described, wherein $s = ur^e \bmod N$ and where $e = H(c, V, pk)$ where pk is a public key.

Various embodiments are described, further including generating a secret key sk and public key pk further including: generating the two distinct primes p and q and computing N; computing $\lambda = \text{lcm}(p-1, q-1)$; selecting the hash function H modeled as a random oracle with an identifier H_identifier, and wherein the public key pk={N, H_identifier} and the private key sk={$\lambda$}.

Further various embodiments relate to a method of decrypting a ciphertext using a Paillier cryptosystem including a value c, a first verification value, and a second verification value s, including: validating the ciphertext by checking the first verification value based upon the second verification value s, N, the value c, and a hash function H, where N is the product of two distinct primes p and q; deciphering the ciphertext to produce a message m from the value c using a secret key and N.

Various embodiments are described, wherein validating the ciphertext further includes: computing $e = H(c, V)$ and $U = s^N c^{-e} \bmod N$, where V is first verification value; and checking that the first verification value V equals H(U).

Various embodiments are described, wherein validating the ciphertext further includes: computing $e = H(c, V)$ and $U = s^N c^{-e} \bmod N$, where V is first verification value; and checking that the first verification value V equals G(U), where G is a hash function different from hash function H.

Various embodiments are described, wherein $$m = \left( \frac{c^\lambda - 1 \bmod N^2}{N} \right) / \lambda \bmod N$$

N where $\lambda = \text{lcm}(p-1, q-1)$ is the secret key.

Various embodiments are described, wherein deciphering the ciphertext to produce a message m further includes: computing $r = c^d \bmod N$, where d is the secret key and $d = N^{-1} \bmod \lambda$ where $\lambda = \text{lcm}(p-1, q-1)$; and computing $$m = \frac{cr^{-N} - 1 \bmod N^2}{N}.$$

Various embodiments are described, wherein validating the ciphertext further includes: computing $e = H(c, U)$, where U is verification value; and checking that the verification value U equals $s^N c^{-e} \bmod N$.

Various embodiments are described, wherein validating the ciphertext further includes a public key pk.

BRIEF DESCRIPTION OF THE DRAWINGS

In order to better understand various exemplary embodiments, reference is made to the accompanying drawings, wherein:

FIG. 1 illustrates an exemplary hardware diagram for implementing a cryptosystem according to the embodiments described herein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

First, a formal definition for public-key encryption will be described. Then the notion of a zero-knowledge proof will be described.

A public-key encryption scheme includes a tuple of three algorithms (KeyGen, Enc, Dec).

The key generation algorithm KeyGen is a randomized algorithm that takes as input a security parameter $\kappa$ and returns a matching pair (pk, sk) of a public key and a secret key. This may be expressed as $$(pk, sk) \xleftarrow{\$} \text{KeyGen}(\kappa).$$

Encryption is carried out as follows. Let $\mathcal{M}$ denote the message space. The encryption algorithm Enc is a randomized algorithm that takes as input a public key pk and a plaintext $m \in \mathcal{M}$, and returns a ciphertext c. This may be expressed as $$c \xleftarrow{\$} \text{Enc}_{pk}(m).$$

The decryption algorithm Dec takes as input a secret key sk (associated with pk) and a ciphertext c. It returns the corresponding plaintext m or a special symbol $\perp$ indicating that the ciphertext is invalid. This may be expressed as $m \leftarrow \text{Dec}_{sk}(c)$ if c is a valid ciphertext and $\perp \leftarrow \text{Dec}_{sk}(c)$ if it is not.

For any $$(pk, sk) \xleftarrow{\$} \text{KeyGen}(\kappa),$$

it is required that $\text{Dec}_{sk}(\text{Enc}_{pk}(m))=m$ for any message $m \in \mathcal{M}$.

Zero-knowledge proofs will now be described. Informally, in a zero-knowledge proof, Peggy (prover) proves to Victor (verifier) the validity of a statement that includes secret information in a way that Victor does not learn anything more as a result of this process.

For example, consider a cyclic group $\mathbb{G} = \langle g \rangle$ of prime order q, generated by an element g. In order to prove that Peggy knows the discrete logarithm of $y=g^x$, Peggy executes l times the following protocol with Victor:

1. Peggy chooses a random integer $r \in \mathbb{Z}_q$, computes the commitment $C=g^r$ (in $\mathbb{G}$), and sends C to Victor;
2. Victor flips a fair coin $c \in \{0,1\}$ and sends the challenge c to Peggy;
3. Peggy computes the response $R=r+cx \mod q$ and sends R to Victor; and
4. Victor checks that $g^R \stackrel{?}{=} C \cdot y^c$ (in $\mathbb{G}$).

It can be verified that the cheating probability for Peggy is $2^{-l}$.

Zero-knowledge proofs can be made non-interactive in the random oracle model by replacing the challenge by a hash of the transcript to that point. This is known as the Fiat-Shamir heuristic. In the above example, the challenge c is then set to c=h(C) for some cryptographic hash function h mapping to $\{0,1\}$. This can be further improved to a single pass using the Schnorr protocol (again in the random oracle model) by viewing the pair $(x, y=g^x)$ as a signing/verification key pair:

1a. Peggy chooses a random integer $r \in \mathbb{Z}_q$ and computes the commitment $C=g^r$;
1b. Peggy forms the challenge c=H(C) (for some cryptographic hash function mapping to $\mathbb{Z}_q$), generates the signature $s=r+cx \mod q$ and sends the pair (C, s) to Victor; and
2. Victor checks that $g^s \stackrel{?}{=} C \cdot y^c$ (in $\mathbb{G}$) where c=H(C).

Assuming that H behaves as a random oracle, the cheating probability for Peggy is 1/q.

If the representation of c is shorter than that of C (which is usually the case), Peggy can instead send the pair (c, s) to Victor. The verification equation is then replaced with $c \stackrel{?}{=} H(g^s \cdot y^{-c})$.

The Paillier cryptosystem and the Guillou-Quisquater (GQ) identification scheme will now be briefly described.

The Paillier cryptosystem is a public-key encryption scheme supporting a large message space. For a more detailed description see Pascal Paillier, *Public-key cryptosystems based on composite degree residuosity classes*, Advances in Cryptology—EUROCRYPT '99 (Jacques Stern, ed.), Lecture Notes in Computer Science, vol. 1592, Springer, Heidelberg, May 1999, pp. 223-238, which incorporated herein for all purposes by reference. Furthermore, as will be apparent, the scheme is equipped with an additive homomorphism. This property is useful when one performs addition operations on the ciphertexts.

A description of the Paillier cryptosystem is as follows.

Key generation: Let $\kappa$ be a security parameter. On input $\kappa$, the key generation algorithm generates two distinct primes p and q and computes N=pq and $\lambda$=lcm(p−1, q−1). The public key is pk={N} and private key is sk={$\lambda$}.

The message space is $\mathcal{M} = \mathbb{Z}_N$, namely the ring of integers modulo N.

Encryption: The encryption of a message $m \in \mathcal{M}$, $$c \xleftarrow{\$} \text{Enc}_{pk}(m),$$

is given by $c=(1+mN)r^N \mod N^2$ for a random integer $r \in [1, N)$.

Decryption: Given a ciphertext c, the corresponding plaintext is recovered using the private key $\lambda$ in two steps as:

1. Compute $$L = \frac{c^\lambda - 1 \mod N^2}{N}; \text{ and}$$

and
2. Return $m=L/\lambda \mod N$.

It is worth noting that for any $\rho \in \mathbb{Z}_{N^2}$, one has $\rho^N \equiv (\rho \mod N)^N (\mod N^2)$. This is why random integer r is defined in the range [1, N) in Paillier's encryption.

The Paillier cryptosystem is additively homomorphic. Given two Paillier ciphertexts, $$c_1 \xleftarrow{\$} \text{Enc}_{pk}(m_1) \text{ and } c_2 \xleftarrow{\$} \text{Enc}_{pk}(m_2),$$

the addition of $c_1$ and $c_2$ is defined as $$\text{Add}H(c_1,c_2) = (c_1 \cdot c_2)\rho^N \bmod N^2$$

for some integer $\rho \in [1, N)$. The scheme is said to be additively homomorphic because the decryption of the so-obtained ciphertext yields the message $m_1+m_2$ (as an element in $\mathcal{M}$). Indeed, letting $c_1=(1+m_1N)r_1^N \bmod N^2$ and $c_2=(1+m_2N)r_2^N \bmod N^2$, the following results $$(c_1 \cdot c_2)\rho^N \equiv (1 + m_1N)r_1^N(1 + m_2N)r_2^N \rho^N$$
$$\equiv (1 + (m_1 + m_2)N)R^N \pmod{N^2}$$

with $R=r_1r_2\rho \bmod N^2$, the decryption of which leads to $m_1+m_2 \pmod{N}$.

The Guillou-Quisquater (GQ) identification protocol will now be described. The so-called GQ protocol, named after its inventors Guillou and Quisquater, is a practical zero-knowledge protocol. For more detailed information about the GQ protocol see Louis C. Guillou and Jean-Jacques Quisquater, *A practical zero-knowledge protocol fitted to security microprocessor minimizing both transmission and memory*, Advances in Cryptology—EUROCRYPT '88 (C. G. Günther, ed.), Lecture Notes in Computer Science, vol. 330, Springer, Heidelberg, May 1988, pp. 123-128, which is incorporated herein for all purposes by reference.

Let $N=pq$ where p and q are distinct primes. To prove in a zero-knowledge way that Peggy knows a secret value s satisfying $s^ev \equiv 1 \pmod{N}$ where v, e, N are public, Peggy (prover) executes the following protocol with Victor (verifier):

1. Peggy chooses a random integer r in $\mathbb{Z}_N$, computes the commitment $C=r^e \bmod N$, and sends C to Victor;
2. Victor chooses a random challenge $c \in \mathbb{Z}_e$ and sends c to Peggy;
3. Peggy computes the response $R=rs^c \bmod N$ and sends R to Victor;
4. Victor checks that $C \stackrel{?}{=} R^e v^c \pmod{N}$.

Proof. It is easily verified that $R^ev^c \equiv (rs^c)^ev^c \equiv r^e(s^ev)^c \equiv C \pmod{N}$.

Assuming the random oracle model, the proof can be made non-interactive by replacing c with H(C) for some cryptographic hash function H mapping to $\mathbb{Z}_e$.

In the presence of a passive adversary, the "right" notion of security for public-key encryption is known as semantic security. Informally, it means that an adversary should not learn any information whatsoever about a plaintext given its encryption (beyond the length of the plaintext).

Against active adversaries, this is not enough. The "right" notion of security is then chosen-ciphertext security or equivalently non-malleability. Intuitively, it implies that semantic security must hold even if the attacker is given adaptive access to a decryption oracle.

More formally, an adversary $\mathcal{A}$ is viewed as a pair ($\mathcal{A}_1$, $\mathcal{A}_2$) of probabilistic algorithms. This corresponds to adversary $\mathcal{A}$ running the algorithms in two stages.

In the "find" stage, algorithm $\mathcal{A}_1$ takes as input the public key pk. $\mathcal{A}_1$ can submit any ciphertext of its choice and receives the corresponding plaintext (or $\bot$). $\mathcal{A}_1$ outputs two equal-size messages $m_0$ and $m_1 \in \mathcal{M}$.

In the "guess" stage, algorithm $\mathcal{A}_2$ receives a challenge ciphertext c* which is the encryption of $m_0$ or of $m_1$ under pk; i.e., $c^* \leftarrow \text{Enc}_{pk}(m_b)$ where b is chosen uniformly at random in $\{0,1\}$. Again, $\mathcal{A}_2$ can submit any ciphertext and see the corresponding decryption; the sole exception is that $\mathcal{A}_2$ cannot ask for the decryption of the challenge ciphertext c*.

The goal of $\mathcal{A}_2$ is to guess correctly—with probability significantly greater than ½—if c* corresponds to the encryption of $m_0$ or of $m_1$.

An encryption scheme is said chosen-ciphertext secure if no such adversary $\mathcal{A}=(\mathcal{A}_1, \mathcal{A}_2)$ exists.

The Paillier cryptosystem is semantically secure. Unfortunately, the Paillier cryptosystem does not meet the stronger notion of chosen-ciphertext security. This is due to the underlying additive homomorphism.

Upon receiving the challenge ciphertext $c^*=(1+m_bN)r^N \bmod N^2$, the adversary $\mathcal{A}_2$ does the following:

1. It chooses at random $\mu, \rho \in \mathbb{Z}_N$ and forms the ciphertext $c^\dagger = c^*(1+\mu N)\rho^N \bmod N^2$;
2. It submits $c^\dagger$ to the decryption oracle and obtains the corresponding plaintext $m^\dagger$;
3. It recovers $m_b = m^\dagger - \mu \bmod N$; and
4. If $m_b=m_0$ it outputs 0; otherwise it outputs 1.

To remedy this situation, Paillier subsequently proposed with Pointcheval a chosen-ciphertext secure version of his cryptosystem. For more details see Pascal Paillier and David Pointcheval, *Efficient pubic-key cryptosystems provably secure against active adversaries*, Advances in Cryptology—ASIACRYPT '99 (Kwok-Yan Lam, Eiji Okamoto, and Chaoping Xing, eds.), Lecture Notes in Computer Science, vol. 1716, Springer, Heidelberg, November 1999, pp. 165-179, which is hereby incorporated herein by reference for all purposes. The improved cryptosystem requires two hash functions G, H mapping to $\mathbb{Z}_N$. Slightly simplifying the scheme described by Paillier and Pointcheval, the encryption of a message $m \in \mathcal{M}$ is given by $$c=(1+MN)z \bmod N^2 \text{ where}$$

$$z=H(m,r)^N \bmod N^2 \text{ and } M=m\|r+G(z \bmod N) \bmod N.$$

The decryption of c proceeds in two stages as follows.
Recovering M: Recover M using the private key $\lambda$ as:
1. Compute $$L = \frac{c^\lambda - 1 \bmod N^2}{N}; \text{ and}$$

and
2. Obtain $M=L/\lambda \bmod N$.

Validating the ciphertext and returning the message or $\bot$:
Define $m\|r=M-G(c \bmod N)$.
If $H(m, r)^N \equiv c \pmod{N}$ return m;
Otherwise, return $\bot$ (invalid ciphertext).

The Paillier-Pointcheval cryptosystem is chosen-ciphertext secure. Unfortunately, checking the validity of a ciphertext requires the knowledge of the private decryption key. In a threshold environment none of the decryption servers possess the private key needed to perform this validity test. Consequently, there is a need for chosen-ciphertext versions of Paillier cryptosystem with public validity test. This disclosure presents several embodiments of such a Paillier cryptosystem.

In addition to chosen-ciphertext security, the proposed cryptosystems have two useful features: public validity and compatibility. Anyone can check the validity of a ciphertext. No private key is involved in the process. This is useful for threshold decryption. The resulting ciphertexts can readily be converted into regular Paillier ciphertexts. This is useful when addition operations need to be applied to ciphertexts.

An important observation is that a Paillier ciphertext, $c=(1+mN)r^N \bmod N^2$, satisfies the relation $$r^N c^{-1} \equiv 1 (\bmod N).$$

Viewing the pair $(r, c^{-1} \bmod N)$ as a signing/verification key pair in the GQ protocol, the encryptor can prove the knowledge of the randomness r used for forming the ciphertext by issuing a GQ 'signature' (U, s) with $$U=u^N \bmod N \text{ and } s=ur^e \bmod N \text{ where } e=H(c,U)$$

for some cryptographic hash function H.

A first embodiment of a modified Paillier cryptosystem will now be described. Based on the above observation, the Paillier cryptosystem can therefore be modified into a new cryptosystem. The key generation, encryption, and decryption operations of the first embodiment will now be described.

Key generation proceeds as follows. Let κ be a security parameter. On input κ, the key generation algorithm generates two distinct primes p and q and selects a hash function H modeled as a random oracle. The key generation operation computes $N=pq$ and $\lambda=\text{lcm}(p-1, q-1)$. The public key is pk={N, H_identifier} and private key is sk={λ}. The message space is $\mathcal{M} = \mathbb{Z}_N$, namely the ring of integers modulo N.

Encryption proceeds as follows. The encryption of a message $m \in \mathcal{M}$, $$\mathfrak{C} \xleftarrow{\$} \text{Enc}_{pk}(m),$$

is given by the tuple (c, U, s) where $$c=(1+mN)r^N \bmod N^2, \ U=u^N \bmod N, \ s=ur^e \bmod N$$

for random integers r, $u \in [1, N)$ and where $e=H(c, U)$.

Decryption proceeds as follows. Given a ciphertext $\mathfrak{C}=(c, U, s)$, the decryption process proceeds in two stages.

Validating the ciphertext: Compute $e=H(c, U)$ and check whether $U \stackrel{?}{=} s^N c^{-e} (\bmod N)$. If not, return ⊥ and abort.

Deciphering the ciphertext: From the component c, the corresponding plaintext may be recovered using the private key λ in two steps as:

1. Compute $$L = \frac{c^\lambda - 1 \bmod N^2}{N}; \text{ and}$$

and

2. Return $m=L/\lambda \bmod N$.

Given a ciphertext $\mathfrak{C}=(c, U, s)$ with $c=(1+mN)r^N \bmod N^2$, the knowledge of the randomness $r(\bmod N)$ used in the construction of c is equivalent to the knowledge of the underlying plaintext m since $$m = \frac{cr^{-N} - 1 \bmod N^2}{N}.$$

Hence, the above cryptosystem yields a zero-knowledge proof of knowledge of the plaintext.

The previous cryptosystem is subject to many variants. For example, the hash function can include the public key as an additional input by defining $e=H(c, U, pk)$.

Another variant is to define the private sk={d} where $d=N^{-1} \bmod \lambda$, and to recover the plaintext corresponding to a valid ciphertext $\mathfrak{C}=(c, U, s)$ using d to 1. Compute $r=c^d \bmod N$, and
2. Return $$m = \frac{cr^{-N} - 1 \bmod N^2}{N}.$$

A second embodiment of a modified Paillier cryptosystem will now be described. In practical settings, the size of modulus N is much larger than the image size of hash function H. For example, for a security level of κ=128 bits, N is of size 3072 bits, and a hash value is of size 256 bits.

It is therefore advantageous to trade a mod-N value against a hash value. The second embodiment provides such a modification. It results in shorter ciphertexts while keeping the properties of the first embodiment. The key generation, encryption, and decryption operations of the second embodiment will now be described.

Key generation proceeds as follows: Let κ be a security parameter. On input κ, the key generation algorithm generates two distinct primes p and q and selects a hash function H modeled as a random oracle. It computes $N=pq$ and $\lambda=\text{lcm}(p-1, q-1)$. The public key is pk={N, H_identifier} and the private key is sk={λ}. The message space is $\mathcal{M} = \mathbb{Z}_N$, namely the ring of integers modulo N.

Encryption proceeds as follows. The encryption of a message $m \in \mathcal{M}$, $$\mathfrak{C} \xleftarrow{\$} \text{Enc}_{pk}(m),$$

is given by the tuple (c, V, s) where $$c=(1+mN)r^N \bmod N^2, \ V=H(u^N \bmod N), \ s=ur^e \bmod N$$

for random integers r, $u \in [1, N)$ and where $e=H(c, V)$.

Decryption proceeds as follows: Given a ciphertext $\mathfrak{C}=(c, V, s)$, the decryption process proceeds in two stages.

Validating the ciphertext: Compute $e=H(c, V)$ and $U=s^N c^{-e} \bmod N$, and check whether $V \stackrel{?}{=} H(U)$. If not, return ⊥ and abort.

Deciphering the ciphertext: From the component c, the corresponding plaintext can be recovered using the private key λ in two steps as:

1. Compute $$L = \frac{c^\lambda - 1 \bmod N^2}{N}; \text{ and}$$

and

2. Return $m=L/\lambda \bmod N$.

Several variants may be derived from the above description. In particular, the modifications mentioned with respect to the first embodiment described above apply similarly to this second embodiment. Yet another variant is to select a different hash function, for example $V=G(u^N \bmod N)$, for defining the component V of a ciphertext.

Note that the embodiments described above produce ciphertexts that are triplets where the first component is a regular Paillier ciphertext. It is therefore straightforward to convert any ciphertext into a regular Paillier ciphertext.

Embodiments described herein may be applied to all services or products requiring chosen-ciphertext secure encryption. Remarkably, the validity of the resulting ciphertexts can be publicly verified. Furthermore, the resulting ciphertexts can be converted into regular Paillier ciphertexts and so combined using the underlying additive homomorphism. Accordingly, the embodiments described herein provide a technological advancement to encryption protocols that are both homomorphic and secure against chosen ciphertext attacks.

FIG. 1 illustrates an exemplary hardware diagram 100 for implementing a cryptosystem according to the embodiments described above. As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150. In some embodiments, no user interface may be present.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. Further, software for key generation, 162, encryption 163, and decryption 163 may be stored in the memory. This software may implement the various embodiments described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of encrypting a message m using a Paillier cryptosystem, comprising:

computing a ciphertext c based upon the message m, N, and r, where N is the product of two distinct primes p and q, and r is randomly chosen such that $r \in [1, N)$;

computing a first verification value based upon u and N, where u is randomly chosen such that $u \in [1, N)$; and computing a second verification value s based upon u, r, the ciphertext c, the verification value, and a hash function H, wherein $U = u^N \bmod N$ where U is the first verification value, and wherein $s = u \, r^e \bmod N$ and where $e = H(c, U)$.

2. The method of claim 1, wherein $c = (1+mN)r^N \bmod N^2$.

3. The method of claim 1, wherein $s = u \, r^e \bmod N$ and where $e = H(c, U, pk)$ where pk is a public key.

4. A method of encrypting a message m using a Paillier cryptosystem, comprising:

computing a ciphertext c based upon the message m, N, and r, where N is the product of two distinct primes p and q, and r is randomly chosen such that $r \in [1, N)$;

computing a first verification value based upon u and N, where u is randomly chosen such that u∈[1,N); and computing a second verification value s based upon u, r, the ciphertext c, the verification value, and a hash function H, wherein $V=H(u^N \bmod N)$ where V is the first verification value.

5. The method of claim 4, wherein $s=ur^e \bmod N$ and where $e=H(c, V)$.

6. The method of claim 4, wherein $s=ur^e \bmod N$ and where $e=H(c, U, pk)$ where pk is a public key.

7. A method of encrypting a message m using a Paillier cryptosystem, comprising:

computing a ciphertext c based upon the message m, N, and r, where N is the product of two distinct primes p and q, and r is randomly chosen such that r∈[1,N);

computing a first verification value based upon u and N, where u is randomly chosen such that u∈[1,N); and computing a second verification value s based upon u, r, the ciphertext c, the verification value, and a hash function H, wherein $V=G(u^N \bmod N)$ where V is the first verification value and G is a hash function different from hash function H.

8. The method of claim 7, wherein $s=ur^e \bmod N$ and where $e=H(c, V)$.

9. The method of claim 7, wherein $s=ur^e \bmod N$ and where $e=H(c, V, pk)$ where pk is a public key.

10. The method of claim 1, further comprising generating a secret key sk and public key pk further including:

generating the two distinct primes p and q and computing N;

computing $\lambda=\text{lcm}(p-1, q-1)$;

selecting the hash function H modeled as a random oracle with an identifier H_identifier; and wherein the public key pk={N, H_identifier} and the private key sk={λ}.

11. A method of decrypting a ciphertext using a Paillier cryptosystem including a value c, a first verification value, and a second verification value s, comprising:

validating the ciphertext by checking the first verification value based upon the second verification value s, N, the value c, and a hash function H, where N is the product of two distinct primes p and q;

deciphering the ciphertext to produce a message m from the value c using a secret key and N;

computing $e=H(c, V)$ and $U=s^N c^{-e} \bmod N$, where V is first verification value; and checking that the first verification value V equals H(U).

12. A method of decrypting a ciphertext using a Paillier cryptosystem including a value c, a first verification value, and a second verification value s, comprising:

validating the ciphertext by checking the first verification value based upon the second verification value s, N, the value c, and a hash function H, where N is the product of two distinct primes p and q;

deciphering the ciphertext to produce a message m from the value c using a secret key and N;

computing $e=H(c, V)$ and $U=s^N c^{-e} \bmod N$, where V is first verification value; and checking that the first verification value V equals G(U), where G is a hash function different from hash function H.

13. The method of claim 11, wherein $$m = \left(\frac{c^\lambda - 1 \bmod N^2}{N}\right) / \lambda \bmod N$$

where $\lambda=\text{lcm}(p-1, q-1)$ is the secret key.

14. The method of claim 11, wherein deciphering the ciphertext to produce a message m further includes:

computing $r=c^d \bmod N$, where d is the secret key and $d=N^{-1} \bmod \lambda$ where $\lambda=\text{lcm}(p-1, q-1)$; and computing $$m = \frac{cr^{-N} - 1 \bmod N^2}{N}.$$

15. A method of decrypting a ciphertext using a Paillier cryptosystem including a value c, a first verification value, and a second verification value s, comprising:

validating the ciphertext by checking the first verification value based upon the second verification value s, N, the value c, and a hash function H, where N is the product of two distinct primes p and q;

deciphering the ciphertext to produce a message m from the value c using a secret key and N;

computing $e=H(c, U)$, where U is verification value; and checking that the verification value U equals $s^N c^{-e} \bmod N$.

16. The method of claim 11, wherein validating the ciphertext further includes a public key pk.

* * * * *